United States Patent [19]

Yates, Jr. et al.

[11] Patent Number: 5,028,575

[45] Date of Patent: Jul. 2, 1991

[54] PROCESS FOR THE CHEMICAL MODIFICATION OF ALUMINUM OXIDE SUPPORTED RHODIUM CATALYSTS AND ASSOCIATED AUTOMOTIVE CATALYST

[75] Inventors: John T. Yates, Jr., Allison Park; Dilip K. Paul; Todd H. Ballinger, both of Pittsburgh, all of Pa.

[73] Assignee: University of Pittsburgh, Pittsburgh, Pa.

[21] Appl. No.: 515,385

[22] Filed: Apr. 27, 1990

[51] Int. Cl.$^5$ ............................................. B01J 21/02
[52] U.S. Cl. ..................................... 502/158; 502/332
[58] Field of Search ................................ 502/158, 332

[56] References Cited

U.S. PATENT DOCUMENTS

| | | | |
|---|---|---|---|
| 3,336,239 | 8/1967 | Bailey et al. | 252/430 |
| 3,389,092 | 6/1968 | Sanford et al. | 252/430 |
| 3,956,179 | 5/1976 | Sebastian et al. | 252/430 |
| 4,005,046 | 1/1977 | Chandra et al. | 252/428 |
| 4,013,590 | 3/1977 | Buonomo et al. | 502/263 |
| 4,513,101 | 4/1985 | Peters et al. | 502/304 |

OTHER PUBLICATIONS

"Structure of Rhodium in an Ultradispersed Rh/Al$_2$O$_3$ Catalyst as Studied by EXAFS and Other Techniques", *J. Am. Chem. Soc.*, vol. 107, 3139-3147 (1985), H. F. J. van't Blik, J. B. A. D. van Zon, T. Huizinga, J. C. Vis, D. C. Koningsberger and R. Prins.

"An Infrared Study of the Influence of CO Chemisorption on the Topology of Supported Rhodium", *J. Phys. Chem.*, vol. 89, 4789-4793 (1985), Frigyes Solymosi and Monika Pasztor.

"Infrared Study of the Effect of H$_2$ on CO-Induced Structural Changes in Supported Rh", *J. Phys. Chem.*, vol. 90, 5312-5317 (1986), Frigyes Solymosi and Monika Pasztor.

"Spectroscopic Evidence for the Involvement of OH Groups in the Formation of Rh (CO)$_2$ on Metal Oxide Supports", *J. Phys. Chem.*, vol. 91, 3133-3136 (1987), P. Basu, D. Panayotov and J. T. Yates, Jr.

"Rhodium-Carbon Monoxide Surface Chemistry: The Involvement of Surface Hydroxyl Groups on Al$_2$O$_3$ and SiO$_2$ Supports", *J. Am. Chem. Soc.*, vol. 110, 2074-2081 (1988), P. Basu, D. Panayotov and John T. Yates, Jr.

"Reduction of Rh$^{3+}$ on Supported Rhodium Surfaces by CO", *J. Phys. Chem.*, vol. 93, 1532-1536 (1989), C. P. Booker and J. T. Keiser.

*Primary Examiner*—Patrick P. Garvin
*Assistant Examiner*—Brent M. Pebbles
*Attorney, Agent, or Firm*—Arnold B. Silverman; Craig G. Cochenour

[57] ABSTRACT

A process for chemically removing surface hydroxyl groups present on an aluminum oxide supported rhodium catalyst that is suitable for use as an automotive catalyst in controlling automotive exhaust emissions is disclosed. The process includes removing the hydroxyl groups from the aluminum oxide supported catalyst by silation at a temperature preferably equal to or greater than about 450 K so that the conversion of active metallic rhodium Rh$_x$(0) to oxidized rhodium species Rh$^{(I)}$ cannot substantially occur by reduction of the active hydroxyl groups. The silation is carried out by exposing the aluminum oxide supported rhodium catalyst to a gas phase alkylhalosilane. Subsequent to the silation, evacuation of the alkylhalosilane treated aluminum oxide supported rhodium catalyst is effected to remove substantially all unreacted alkylhalosilane. An associated catalyst suitable for use in automotive catalytic converter technology for environmental protection is also provided.

20 Claims, 4 Drawing Sheets

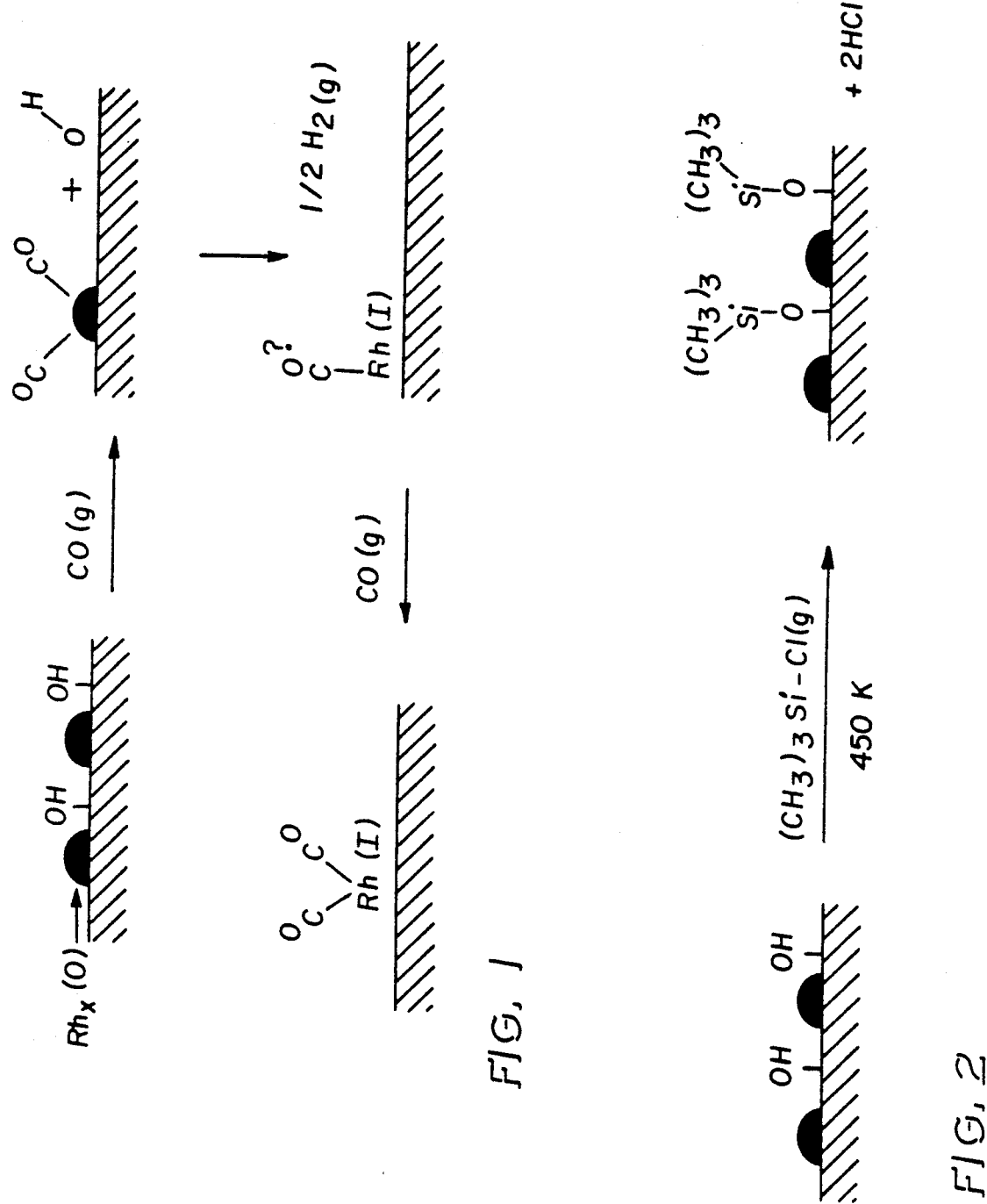

PROCESS FOR THE CHEMICAL MODIFICATION OF ALUMINUM OXIDE SUPPORTED RHODIUM CATALYSTS AND ASSOCIATED AUTOMOTIVE CATALYST

BACKGROUND OF THE INVENTION

1. Field of the Invention

This invention relates to the chemical modification of an aluminum oxide supported rhodium catalyst that forms the basis for an improved automotive catalytic converter useful in environmental protection. More specifically, this chemical modification involves the use of a silation agent to remove surface hydroxyl groups from the aluminum oxide so that the conversion of active rhodium $Rh_x^{(o)}$ to oxidized rhodium species $Rh^{(I)}$ by reduction of the active hydroxyl groups cannot substantially occur.

2. Brief Description of the Prior Art

Automotive catalysts for controlling automotive exhaust emissions are comprised of the noble metals platinum (Pt), palladium (Pd) and rhodium (Rh). Of these metals, rhodium is the most effective for reducing the oxides of nitrogen to nitrogen gas. Generally in the automotive catalyst field, rhodium is highly dispersed on aluminum oxide ($Al_2O_3$) supports and is active as the metal, designated $Rh_x^{(o)}$ where the subscript x refers to the number of Rh atoms in a Rh crystallite or assembly. It is known that active $Rh_x^{(o)}$ may be converted to an oxidized species $Rh^{(I)}$ by a complex oxidation process in which surface hydroxyl groups present on the oxide support phase are consumed in the presence of carbon monoxide (CO) gas. Both the carbon monoxide gas and the surface hydroxyl groups simultaneously participate in the destruction of the $Rh_x^{(o)}$. This process can be reversed using hydrogen gas ($H_2$) which reduces the $Rh^{(I)}$ surface species, present as $Rh^{(I)}(CO)_2$ species, to $Rh_x^{(o)}$ while regenerating the isolated hydroxyl groups.

A number of patents disclose processes for hydrogenation and reduction reactions which are effected in the presence of catalysts. It would be generally expected by those persons skilled in the art that the silation reactant that is reacted with the metal catalyst will react with reduced metal sites, such as for example $Rh_x^{(O)}$.

U.S. Pat. No. 3,336,239 discloses that metal compounds containing a metal component in one of its oxidation states, such as rhodium $Rh(+1+2+3)$, can be made extremely active for use as hydrogenation and/or reduction catalysts by reacting the metal compounds with a silane containing Si-H bonds. This patent uses silanes to reduce oxidized metals to make catalysts by breaking the Si-H bond. In the present application there are no Si-H bonds. This patent states that the starting silicon compounds can constitute a monomer, a polymer, or any mixture thereof, such that silanes having both halo or organo substituents may be used to reduce oxidized metals to make catalysts.

U.S. Pat. No. 3,389,092 discloses a process for the preparation of silica-alumina catalysts or supports for catalytic metals by reacting a solid adsorptive hydroxyl-containing alumina with an organo silane. This is then followed by heating and oxidation to make a silica-alumina powder.

U.S. Pat. No. 3,956,179 discloses a process for chemically modifying the surfaces of inorganic solid bodies having hydroxyl groups suitable for use as stationary phases in chromatography and in catalysts. With reference to chromatographic separation processes, this patent teaches that alkyl chains of alkylhalosilanes are chemically bound through a Si atom to the oxygen atom of the hydroxyl group in a reaction which substitutes the hydroxyl hydrogen with the alkyl silane by forming —O-Si-alkyl linkages. Further, as to liquid and gas chromatography this patent states that the Si-alkyl chains carry reactive hetero atoms which can then be substituted by desired groups.

U.S. Pat. No. 4,005,046 discloses a catalyst carrier substance which may be obtained by reacting an inorganic particulate solid having surface hydroxyl groups with an organo silicon compound containing sulphur. Further, this patent states that the carrier may be converted to a supported catalyst by a reaction with a compound or complex of platinum or rhodium.

In spite of these prior art disclosures, there remains a very real and substantial need for a process for the chemical modification of an aluminum oxide supported rhodium catalyst while leaving the reduced rhodium sites, $Rh_x^{(0)}$ essentially unreacted. This process may be employed to create an automotive catalyst converter which is beneficial for environmental protection. More specifically, there is a need for such a chemical modification using silation wherein surface hydroxyl groups are removed from the aluminum oxide support so that the conversion of active rhodium $Rh_x^{(0)}$ to oxidized rhodium species $Rh^{(I)}$ by reduction of the active hydroxyl groups is substantially resisted or prevented.

BRIEF DESCRIPTION OF THE DRAWINGS

FIG. 1 shows a schematic diagram of the oxidative degradation of metallic Rh particles by isolated —OH groups.

FIG. 2 shows a schematic diagram of the functionalization of isolated —OH groups on $Rh/Al_2O_3$.

SUMMARY OF THE INVENTION

Figure 3:
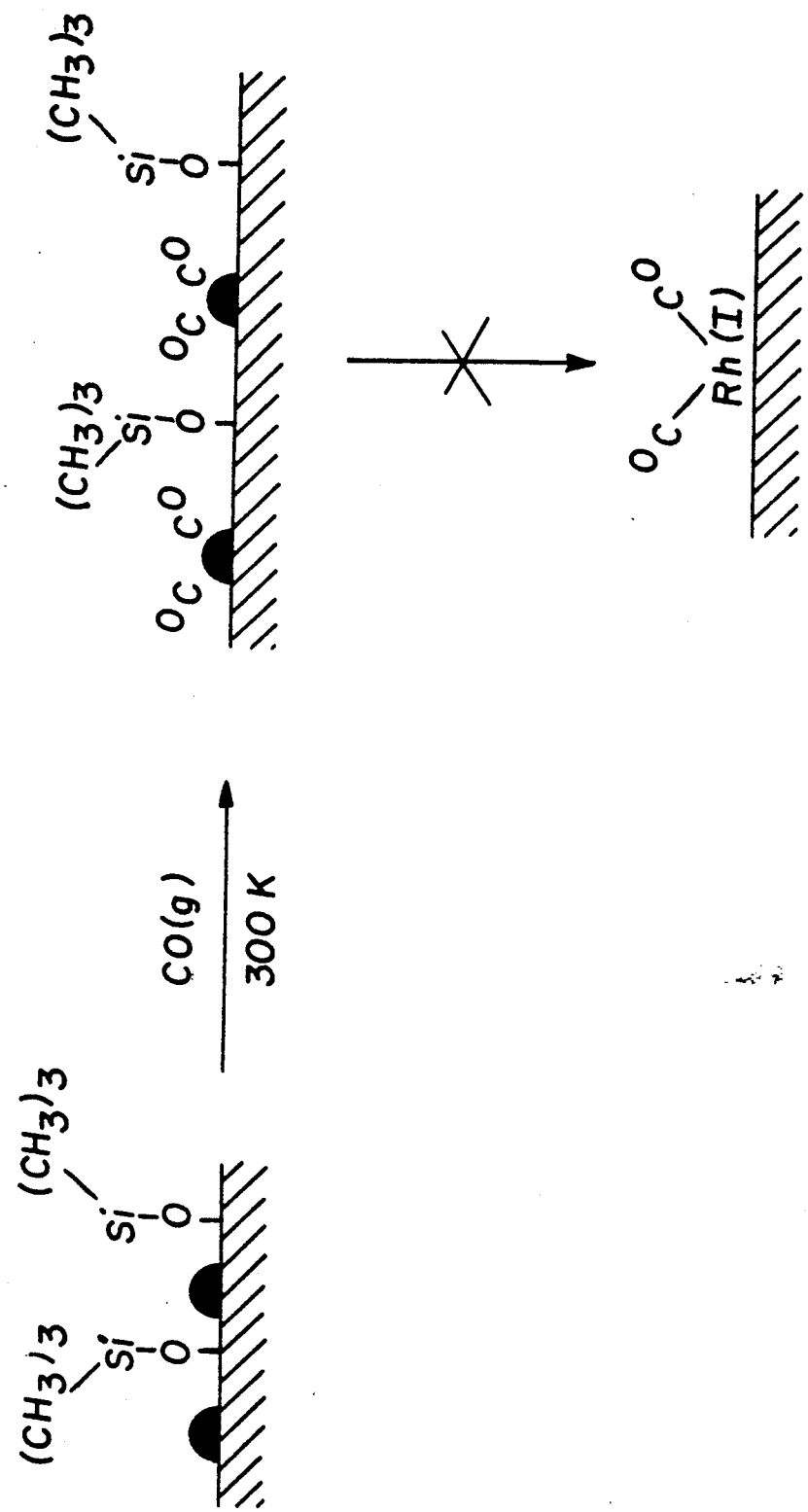
FIG. 3 shows a schematic diagram of carbon monoxide adsorption behavior on the functionalized $Rh/Al_2O_3$.

The present invention has met the above-described need. A process of the present invention provides an efficient and economical chemical modification of aluminum oxide supported rhodium catalysts for enhancing performance when used to control automotive exhaust emissions.

The chemical process of this invention includes removing hydroxyl groups from the aluminum oxide supported rhodium catalyst $Rh/Al_2O_3$ by silation. The silation is carried out under pressure wherein the $Rh/Al_2O_3$ catalyst is exposed to an alkylhalosilane in the gas phase. Preferably, the silation is carried out at a temperature equal to or greater than about 450K. This may be followed by evacuation of substantially all unreacted alkylhalosilane. More specifically, the silation has been carried out effectively at about 10 Torr for about 8 hours although other pressures and times may be employed. By removing surface hydroxyl groups through the silation reaction, the undesired oxidative conversion of supported metallic rhodium $Rh_x^{(0)}$ to oxidized rhodium species $Rh^{(I)}$ is resisted.

The chemical process preferably employs trimethylchlorosilane $(CH_3)_3SiCl$ as the alkylhalosilane reactant.

The product that results from the chemical modification of an aluminum oxide supported rhodium catalyst may be a catalyst suitable for use in controlling automotive exhaust emissions. The catalyst includes an aluminum oxide supported rhodium catalyst having non-oxidized rhodium sites, and surface hydroxyl groups silanized with an alkylhalosilane. The catalyst of this invention is characterized by the property of resisting the conversion of nonoxidized rhodium metallic sites $Rh_x^{(0)}$ to oxidized rhodium sites $Rh^{(I)}$.

It is an object of the present invention to provide a chemical process for removing the hydroxyl groups from an aluminum oxide supported rhodium catalyst by a specific chemical reaction with an alkylhalosilane. This process substantially prevents the conversion of active rhodium $Rh_x^{(0)}$ to oxidized rhodium species $Rh^{(I)}$.

It is another object of the present invention to preserve catalytic active metals, following chemical modification of the $Al_2O_3$ support.

It is another object of this invention to use alkylhalosilanes to specifically functionalize hydroxyl groups on aluminum oxide supports containing clean active rhodium sites $Rh_x^{(0)}$ while preserving the $Rh_x^{(0)}$ sites which are found to be essentially unreactive toward the alkylhalosilane.

It is another object of the present invention to provide a chemical process that preserves the active rhodium sites $Rh_x^{(0)}$ environments found in automotive converter technology for environmental protection.

It is another object of the present invention to employ trimethylchlorosilane as the alkylhalosilane reactant.

It is another object of this invention to provide a catalyst that will withstand cycles of oxidation by oxygen gas ($O_2$) followed by reduction in hydrogen gas ($H_2$) without subsequent formation of $Rh^{(I)}(CO)_2$ in the presence of carbon monoxide gas (CO).

It is another object of this invention to provide a catalyst that will withstand hydrolysis by steam without subsequent formation of $Rh^{(I)}(CO)_2$ in the presence of carbon monoxide gas (CO).

It is another object of this invention to enhance the performance of an aluminum oxide supported rhodium catalyst as may be used in controlling automotive exhaust emissions.

It is another object of this invention to provide a chemical process and an automotive catalyst that is economical and compatible with existing automotive catalytic exhaust emission technology for environmental protection.

These and other objects of the invention will be more fully understood from the following description of the invention and the claims appended hereto.

DESCRIPTION OF THE PREFERRED EMBODIMENTS

The product and chemical process of this invention provide for the modification of aluminum oxide supported rhodium catalysts that are used in the automotive industry to control exhaust emissions. The automotive industry includes automobiles and light duty trucks. Light duty trucks include trucks having a gross vehicle weight less than or equal to about 8,500 pounds.

The chemical process of this invention includes removing surface hydroxyl groups from an aluminum oxide supported rhodium catalyst $Rh/Al_2O_3$ by silation. The silation is carried out under suitable pressures and times wherein the $Rh/Al_2O_3$ catalyst is exposed to an alkylhalosilane in the gas phase preferably at a temperature equal to or greater than about 450K. More specifically the silation has been carried out by an exposure of about 10 Torr alkylhalosilane for about 8 hours. The alkylhalosilane employed in the silation reaction preferably is trimethylchlorosilane $(CH_3)_3SiCl$. By removing the hydroxyl groups from the surface of the aluminum oxide supported rhodium catalyst by using silation, the oxidative conversion of supported metallic rhodium $Rh_x^{(0)}$ to oxidized rhodium $Rh^{(I)}$ is resisted. The process of this invention for resisting $Rh/Al_2O_3$ catalyst degradation was devised on the basis of infrared spectroscopic studies which demonstrated that the isolated hydroxyl groups on either $Al_2O_3$ or $SiO_2$ supports were active as oxidizing agents, converting $Rh_x^{(0)}$ metallic crystallite sites into $Rh^{(I)}$ sites in the presence of carbon monoxide (CO) gas. This oxidative degradation process is schematically shown in FIG. 1. FIG. 1 illustrates the oxidation of $Rh_x^{(0)}$ leading to the formation of $Rh^{(I)}(CO)_2$ species. In FIG. 1, surface hydroxyl groups are shown on an aluminum oxide supported rhodium catalyst. This catalyst is exposed to carbon monoxide gas with the formation of the respective intermediates as shown in FIG. 1. Exposure to carbon monoxide gas results in the formation of $Rh^{(I)}(CO_2$ species. It will be appreciated from FIG. 1 that $Rh^{(I)}(CO)_2$ species are produced as final products from the consumption of isolated -OH groups on the catalyst support in the presence of CO gas.

The process of this invention prepares protected $Rh_x^{(0)}$ catalysts by functionalizing the isolated —OH groups with an alkylhalosilane such as for example $(CH_3)_3SiCl$ as shown in FIG. 2. FIG. 2 illustrates that isolated —OH groups on $Al_2O_3$ are consumed as $(CH_3)_3$ Si—O—Al≡ surface species. Additionally, FIG. 2 shows that hydrogen chloride is formed during the silation of isolated —OH groups on the $Rh/Al_2O_3$ catalyst. In the present invention, the silation of the supported catalyst by extensive exposure to $(CH_3)_3SiCl$ does not result in the deactivation of the metallic $R_x^{(0)}$ particles by alkylchlorosilane chemisorption. This is schematically illustrated in FIG. 3. FIG. 3 shows a silated $Rh/Al_2O_3$ catalyst exposed to carbon monoxide at a temperature of 300K. FIG. 3 shows that carbon monoxide chemisorption on metallic $Rh_x^{(0)}$ sites occurs efficiently, but does not cause $Rh_x^{(0)}$ degradation to $Rh^{(I)}(CO)_2$. Infrared spectra for CO adsorption on the chlorosilanetreated catalyst surface indicate the development of terminal- and bridged-CO species, and isotherms demonstrate the preservation of the expected CO chemisorption capability. The infrared spectra and isotherms illustrate that the chlorosilane is either not reactive with $Rh_x^{(0)}$ sites, or that it is easily displaced by CO from a weaklybonding mode of interaction with $Rh_x^{(0)}$.

Infrared spectra observed for the interaction of $(CH_3)_3SiCl$ with $Al_2O_3$ at a temperature of about 300K indicate that the silation agent, $(CH_3)_3SiCl$, interact reversibly with the isolated hydroxyl groups on the $Al_2O_3$, and that the silane physically adsorbs on alumina through hydrogen bonding to the surface hydroxyl groups. Upon evacuation, it has been found that the isolated hydroxyl groups, not containing weakly bound alkylhalosilane, are restored. This indicates that at a temperature of about 300K a large fraction of the molecularly adsorbed silane is bound by a weak interaction with specific hydroxyl groups. It is thought that the configuration of the reversibly bound $(CH_3)_3SiCl$ species is most likely that in which the partially negative charged chloride moiety interacts with the positively charged hydrogen moiety of the surface hydroxyl group, leaving the trimethyl silyl moiety largely unperturbed relative to its behavior in the gas phase $(CH_3)_3SiCl$ species.

It has been shown that between 300K and about 450K, irreversible chemical reaction begins to occur between the silane and the surface hydroxyl groups.

At an adsorption temperature equal to or greater than about 450K, infrared spectroscopic measurements indicate that an irreversible chemical reaction occurs between the silane and the surface hydroxyl groups with the production of strongly-bound alumasiloxane surface species $(CH_3)_3Si—O—Al\equiv$. These alumasiloxane compounds are produced as hydroxyl groups are consumed. At a temperature equal to or greater than about 450K, it is found that the reaction involves the surface hydroxyl groups, with elimination of hydrogen chloride HCl. The fate of the HCl is not fully understood at present; it may be liberated as the gas or it may adsorb on the $Al_2O_3$ surface.

Another embodiment of this invention provides for the chemical modification of an aluminum oxide supported rhodium catalyst which forms the basis for a catalyst for use in automotive catalytic converters to control automotive exhaust emissions for the protection of the environment. This automotive catalyst includes an aluminum oxide supported rhodium catalyst having non-oxidized rhodium sites. The modified aluminum oxide supported rhodium catalyst is characterized by surface hydroxyl groups having been removed by silation with an alkylhalosilane. The alkylhalosilane has the general chemical formula $R_NSiX_M$ wherein R is an alkyl group, X is a halogen, wherein M and N are each greater than or equal to the number one, and wherein the sum of M and N is equal to 4. The alkylhalosilane may be trimethylchlorosilane.

As determined by spectroscopic measurement, the hereinbefore described chemical process and catalyst of this invention are characterized by the property of resisting the conversion of rhodium metallic sites $Rh_x^{(0)}$ to oxidized rhodium sites $Rh^{(I)}$ under extreme environmental conditions such as may be found in automotive exhaust converters.

Figure 4:
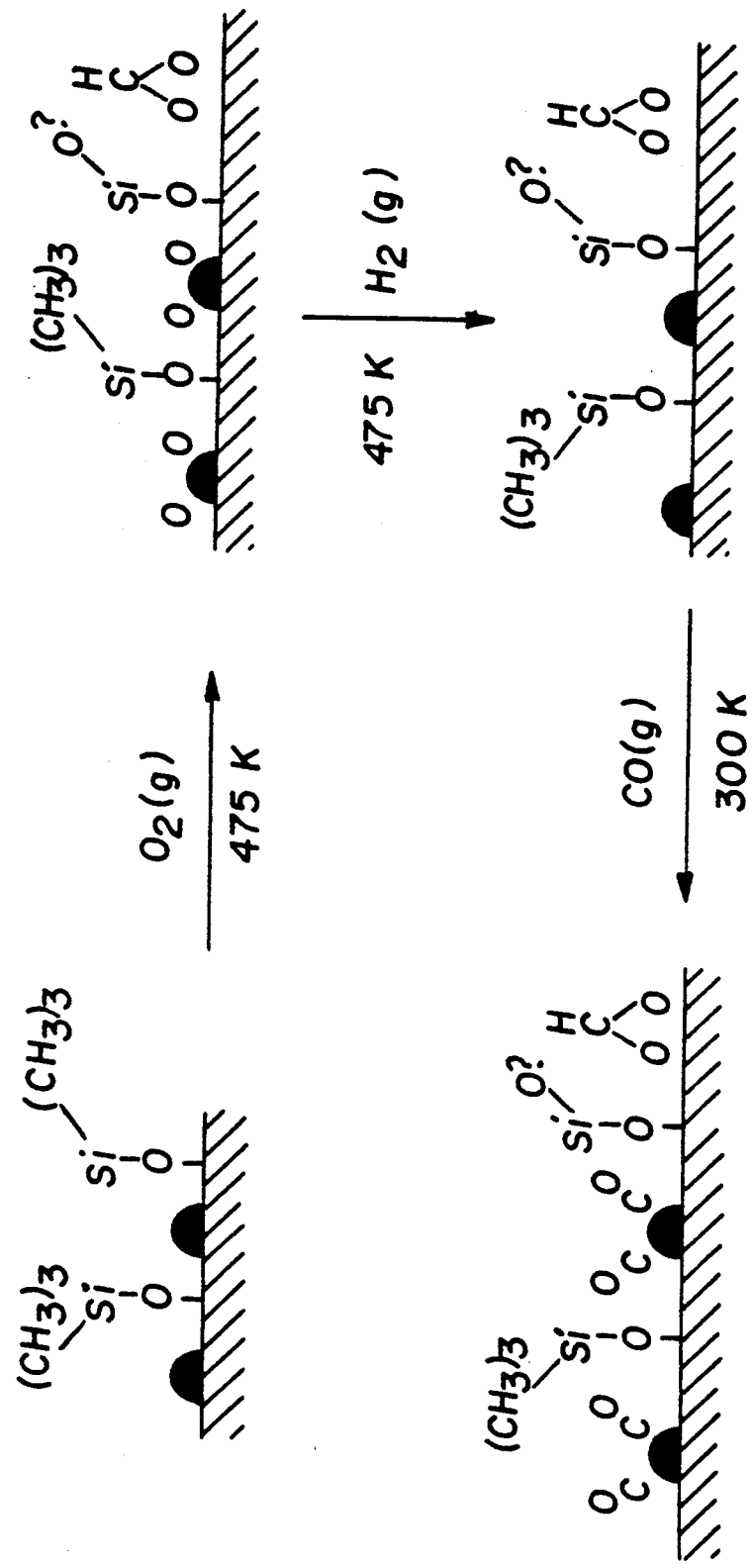
FIG. 4 shows a schematic diagram of a protected $Rh/Al_2O_3$ catalyst under oxidation/reduction conditions.

The first environmental stress applied as a test to the protected silated catalysts of this invention involves oxidation by oxygen gas followed by reduction in hydrogen gas as illustrated in FIG. 4. FIG. 4 shows that although the hydrocarbon moiety in the silyl groups is destroyed to some extent (forming surface formate species), the surface hydroxyl groups are not reformed during oxygen-hydrogen treatment. FIG. 4 illustrates that the silated catalyst remains protected against $Rh^{(I)}(CO)_2$ formation in the presence of carbon monoxide gas.

Figure 5:
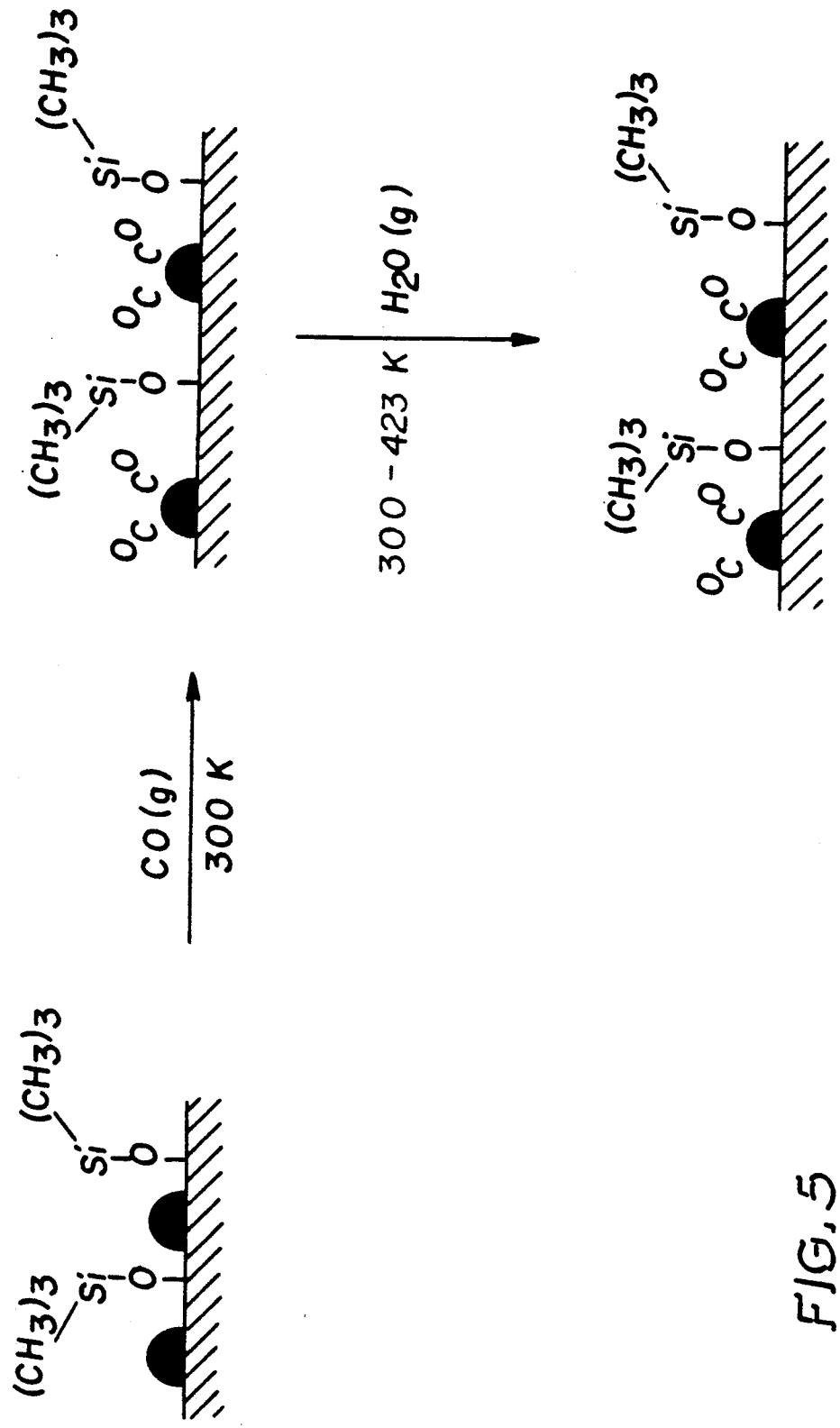
FIG. 5 shows a schematic diagram of a protected $Rh/Al_2O_3$ catalyst under hydrolysis conditions.

The second environmental stress applied as a test to the protected silated catalysts of this invention involves exposure to steam at temperatures from about 300K to 423K as illustrated in FIG. 5. FIG. 5 shows a silated catalyst exposed to carbon monoxide and then to steam at elevated temperatures. FIG. 5 shows that the exposure to groups which lead to the formation of $Rh^{(I)}(CO)_2$ in excess carbon monoxide gas.

The functionalization of Al—OH groups by trimethylchlorosilane leads to the formation of alumasiloxane species which prevent $Rh_x^{(0)}$ to $Rh^{(I)}(CO)_2$ conversion. As shown in FIG. 5, the silation process of this invention is very effective in protecting the aluminum oxide supported rhodium catalyst against hydrolysis by steam, and hence protecting the catalyst against subsequent degradation to $Rh^{(I)}$ in the presence of carbon monoxide.

It will be appreciated by those persons skilled in the art that this invention provides a process for the chemical modification of an aluminum oxide supported rhodium catalyst. The resultant catalyst may advantageously be used in automotive catalytic converters for environmental protection. It will be understood from the hereinbefore described invention that the selective functionalization of Al—OH groups by an alkylhalosilane as hereinbefore described at a temperature equal to or greater than 450K leads to alumasiloxane species which prevent the conversion of $Rh_x^{(0)}$ to $Rh^{(I)}(CO)_2$. Further, the chemical modification provided for in the present invention enhances the performance of an aluminum oxide supported rhodium catalyst such as may be employed in the automotive industry to control automotive exhaust emissions.

EXAMPLE I

For infrared spectroscopic observation, aluminum oxide supported rhodium catalyst samples were prepared in a slurry containing $RhCl_3.3H_2O$ and $Al_2O_3$ (Degussa Aluminium Oxide C) in the appropriate ratio to produce 2.2% by weight $Rh/Al_2O_3$. The slurry was suspended in a liquid consisting of nine parts spectroscopic grade acetone and one part distilled water. The slurry was deposited by spraying through an atomizer onto one half of a 25 mm. diameter $CaF_2$ disk maintained by a hot plate at 340K. The solvents evaporated rapidly leaving a thin adherent film of $RhCl_3.3H_2O$ and $Al_2O_3$ on the support disk. The other half of the $CaF_2$ support disk was sprayed with metal-free $Al_2O_3$ support identical manner. This "half plate" method was employed in order to allow us to observe any chemistry occurring on the support itself which has been treated under identical conditions as the catalyst. A total sample weight of $25-29 \times 10^{-3}$ g was deposited in separate sample preparations, yielding a final surface density $Rh/Al_2O_3$ of $8.7-10.7 \times 10^{-3}$ g/cm$^2$ of the geometrical area for the various samples employed. The surface density of Rh is therefore in the range $1.9-2.4 \times 10^{-4}$ g.Rh/cm$^2$.

The catalyst sample was then mounted inside a stainless steel ultrahigh vacuum infrared cell which was subsequently evacuated by a bakeable all-metal vacuum system employing a liquid-nitrogen cooled sorption pump and a 20 l/sec ion pump. The sample was outgassed under vacuum at 475K for about 72 hours, and subjected to 15, 30, 45, and 60 minute cycles of exposure to approximately 400 Torr $H_2$ at 475K, each cycle being terminated by evacuation to $1 \times 10^{-6}$ Torr. The reduced samples were allowed to remain under vacuum $(1 \times 10^{-6}$ Torr$)$ at 475K for a period of approximately eight hours.

Following catalyst reduction, silation was performed by exposing approximately 10 Torr trimethylchlorosilane $(Ch_3)_3SiCl$ gas in the infrared cell at about 450K for about eight hours. Following silation, CO adsorption isotherms were produced for untreated and $(CH_3)_3SiCl$ treated $Rh/Al_2O_3$ under equilibrium conditions at 300K. It was found that the catalyst pretreated with trimethylchlorosilane at 450K has approximately 30% of the capacity to chemisorb CO relative to the untreated $Rh/Al_2O_3$ surface. The reduction in CO adsorption capacity is expected, since a species, $Rh^{(I)}(CO)_2$, involving 2 CO/Rh is not produced and instead surface species $Rh(0)—CO$ and $Rh_2^{(O)}CO$ are produced.

Subsequent to silation, the $(CH_3)_3SiCl$ modified $Rh/Al_2O_3$ catalyst was evacuated for about two hours at about 475K to remove substantially all unreacted $(CH_3)_3SiCl$.

In controlled studies of the irreversible silation process, the treatment of the $Al_2O_3$ and $Rh/Al_2O_3$ surface at about 450K was performed using four cycles of $(CH_3)_3SiCl$ exposure at 0.3, 1.45, 4.05 and 4.15 Torr for about an hour, each cycle followed by evacuation at about 475K for 30 minutes. The cell was then cooled to about 300K to obtain the infrared spectrum.

Infrared Spectra were obtained using a purged Perkin Elmer Model PE-783 double beam grating Infrared Spectrophotometer coupled with a 3600 Data Acquisition System for data storage and manipulation.

The $(CH_3)_3SiCl$ (Petrarch Systems Inc.), (purity ≩99.9%) was packaged under a $N_2$ atmosphere. It was transferred to a glass/metal storage bulb inside a dry box purged constantly with $N_2$ gas. The reagent gas was purified using several freeze-pump-thaw cycles in a preparative glass vacuum line operating at a base pressure of $1 \times 10^{-7}$ Torr. The high purity of this gas was verified using mass spectrometry. The $H_2$ gas (Matheson) was obtained in a high pressure cylinder with a purity of 99.995%. The CO (Scientific Gas Products) was obtained in a break-seal glass bulb at a purity level of 99.9%.

It will be appreciated by those persons skilled in the art that the $Al_2O_3$ support may be first exposed to silation with the hereinbefore described alkylhalosilane and under the hereinbefore described conditions before securing rhodium to the support in lieu of effecting such exposure after rhodium is secured to the support.

It will be appreciated by those persons skilled in the art that this invention provides a process for the chemical modification of an aluminum oxide supported rhodium catalyst that forms the basis for an automotive catalytic converter useful in environmental protection. It will be understood that the chemical modification of this invention involves the use of a silation agent to remove surface hydroxyl groups from the aluminum oxide support so that the conversion of active rhodium to oxidized rhodium species by reduction of the active hydroxyl groups cannot substantially occur.

Whereas particular embodiments of this invention have been described above for purposes of illustration, it will be evident to those persons skilled in the art that numerous variations of the details of the present invention may be made without departing from the invention as defined in the appended claims.

What is claimed is:

1. A process for chemically modifying an aluminum oxide support for a rhodium catalyst suitable for use as an automotive catalyst in controlling automotive exhaust emissions comprising:
   removing hydroxyl groups from said aluminum oxide support by silation to substantially prevent the oxidative conversion of supported metallic rhodium $Rh_x^{(0)}$ to $Rh^{(I)}$; and
   effecting said silation by exposure of said aluminum oxide support to an alkylhalosilane in the gas phase at a temperature preferably equal to or greater than about 450K.

2. The process of claim 1 including securing said rhodium catalyst to said aluminum oxide support prior to effecting said silation.

3. The process of claim 1 including securing said rhodium catalyst to said aluminum oxide support subsequent to effecting said silation.

4. The process of claim 2 subsequent to said silation including effecting the evacuation of said silated aluminum oxide supported rhodium catalyst to remove substantially all unreacted said alkylhalosilane.

5. The process of claim 2 wherein said alkylhalosilane has the general chemical formula $R_NSiX_M$ wherein R is an alkyl group, X is a halogen, wherein M and N are each greater than or equal to the number one, and wherein the sum of M and N is equal to four.

6. The process of claim 5 wherein said alkylhalosilane is trimethylchlorosilane.

7. The process of claim 5 wherein said silated aluminum oxide supported rhodium catalyst resists undesired oxidation by oxygen gas followed by reduction in hydrogen gas.

8. The process of claim 5 wherein said silated aluminum oxide supported rhodium catalyst resists undesired hydrolysis by steam.

9. A process for chemically modifying an aluminum oxide supported rhodium catalyst suitable for use as an automotive catalyst in controlling automotive exhaust emissions comprising:
   preparing an aluminum oxide supported rhodium catalyst;
   exposing said catalyst to an alkylhalosilane in the gas phase at a temperature preferably equal to or greater than about 450K to selectively functionalize surface hydroxyl groups on aluminum oxide supports of said catalyst containing clean non-oxidized rhodium sites; and
   preserving active rhodium sites $Rh_x^{(0)}$.

10. The process of claim 9 subsequent to said preserving active rhodium sites $Rh_x^{(0)}$ including evacuating said silated aluminum oxide supported rhodium catalyst to remove substantially all unreacted said alkylhalosilane.

11. The process of claim 9 wherein said alkylhalosilane has the general chemical formula $R_NSiX_M$ wherein R is an alkyl group, X is a halogen, wherein M and N are each greater than or equal to the number one, and wherein the sum of M and N is equal to four.

12. The process of claim 11 wherein said alkylhalosilane is trimethylchlorosilane.

13. A process for chemically modifying an aluminum oxide supported rhodium catalyst suitable for use as an automotive catalyst in controlling automotive exhaust emissions comprising:
   removing hydroxyl groups from said aluminum oxide supported catalyst by silation;
   effecting said silation by exposure of said aluminum oxide supported rhodium catalyst to an alkylhalosilane in the gas phase at a temperature preferably equal to or greater than about 450K.

14. The process of claim 13 including evacuating said silated aluminum oxide supported rhodium catalyst to remove substantially all unreacted said alkylhalosilane.

15. The process of claim 14 wherein said alkylhalosilane has the general chemical formula $R_NSiX_M$ wherein R is an alkyl group, X is a halogen, wherein M and N are each greater than or equal to the number one, and wherein the sum of M and N is equal to four.

16. A catalyst suitable for use as an automotive catalyst in controlling automotive exhaust emissions comprising:

an aluminum oxide supported rhodium catalyst having non-oxidized rhodium sites; and said aluminum oxide supported rhodium catalyst characterized by surface hydroxyl groups having been removed by silation with an alkylhalosilane.

17. The catalyst of claim 16 wherein said alkylhalosilane has the general chemical formula $R_N SiX_M$ wherein R is an alkyl group, X is a halogen, wherein M and N are each greater than or equal to the number one, and wherein the sum of M and N is equal to four.

18. The catalyst of claim 17 being characterized by the property of resisting the conversion of rhodium metallic sites $Rh_x^{(O)}$ to oxidized rhodium sites $Rh^{(I)}$.

19. The catalyst of claim 17 being characterized by the property of resisting undesired oxidation by oxygen gas followed by reduction in hydrogen gas.

20. The catalyst of claim 17 being characterized by the property of resisting undesired hydrolysis by steam.

* * * * *

UNITED STATES PATENT AND TRADEMARK OFFICE
CERTIFICATE OF CORRECTION

PATENT NO. : 5,028,575
DATED : July 2, 1991
INVENTOR(S) : JOHN T. YATES, JR., et al.

It is certified that error appears in the above-indentified patent and that said Letters Patent is hereby corrected as shown below:

On the Title Page:

In the Abstract, line 4, "automative" should be --automotive--.

In the Abstract, line 9, "$Rh_x(0)$" should be --$Rh_x^{(0)}$--.

Column 1, line 43, "$Rh_x^{(o)}$" should be --$Rh_x^{(0)}$--.

Column 1, line 46, "$Rh^{(+1+2+3)}$" should be --$Rh^{(+1,+2,+3)}$--.

Column 3, line 19, "catalytic" should be --catalytically--

Column 3, line 29, --in catalytic-- should be inserted before "environments".

Column 3, line 40, "$Rh^{(I)}(CO)_2$" should be --$Rh^{(I)}(CO)_2$--.

Column 4, line 25, "$(CO_2$" should be --$(CO)_2$--.

Column 4, line 35, --are produced-- should be inserted after "species".

Column 4, line 48, "chlorosilanetreated" should be --chlorosilane treated--.

Column 4, line 54, "weaklybonding" should be --weakly bonding--.

Column 5, line 15, a comma --,-- should be inserted after "species".

UNITED STATES PATENT AND TRADEMARK OFFICE
CERTIFICATE OF CORRECTION

PATENT NO. : 5,028,575

DATED : July 2, 1991

INVENTOR(S) : Yates et al.

It is certified that error appears in the above-indentified patent and that said Letters Patent is hereby corrected as shown below:

Column 5, line 19, a comma --,-- should be inserted after "chloride".

Column 5, line 63, --steam at these elevated temperatures did not produce hydroxyl-- should be inserted before "groups".

Column 6, line 36, --material in an-- should be inserted after "support" (second occurrence).

Column 6, line 61, "(Ch$_3$)" should be --(CH$_3$)--.

Column 7, line 16, "Spectra" should be --spectra--.

Column 7, line 21, " ½ " should be -->--.

Column 7, line 44, "the chemical modification of" should be deleted.

UNITED STATES PATENT AND TRADEMARK OFFICE
CERTIFICATE OF CORRECTION

PATENT NO. : 5,028,575
DATED : July 2, 1991
INVENTOR(S) : Yates et al.

It is certified that error appears in the above-indentified patent and that said Letters Patent is hereby corrected as shown below:

Claim 10, column 8, line 40, "$Rh_x^{(o)}$" should be --$Rh_x^{(0)}$--.

Claim 18, column 10, line 5, "$Rh_x^{(o)}$" should be --$Rh_x^{(0)}$--.

Signed and Sealed this

Thirteenth Day of September, 1994

Attest:

BRUCE LEHMAN

*Attesting Officer*     *Commissioner of Patents and Trademarks*